March 18, 1941.  W. BAUSCH  2,235,310
HAEMACYTOMETER
Filed May 11, 1939

WILLIAM BAUSCH
INVENTOR
BY
ATTORNEYS

Patented Mar. 18, 1941

2,235,310

UNITED STATES PATENT OFFICE 2,235,310

HEMACYTOMETER

William Bausch, Rochester, N. Y., assignor to Bausch & Lomb Optical Company, Rochester, N. Y., a corporation of New York Application May 11, 1939, Serial No. 273,069

3 Claims. (Cl. 88—40)

The present invention relates to optical devices having fine rulings such as hemacytometers, counting chambers or the like.

One of the objects of the present invention is to provide a hemacytometer or counting chamber in which the ruled area may be readily found at high magnifications. Another object is to provide a hemacytometer or counting chamber in which the ruled area has a distinctive light transmission. Still another object is to provide a hemacytometer or counting chamber having a body formed of transparent material having one transmission and a ruled area formed of transparent material having a different transmission. These and other objects and advantages reside in the novel features hereinafter set forth and pointed out in the appended claims.

Referring to the drawing.

Figure 1:
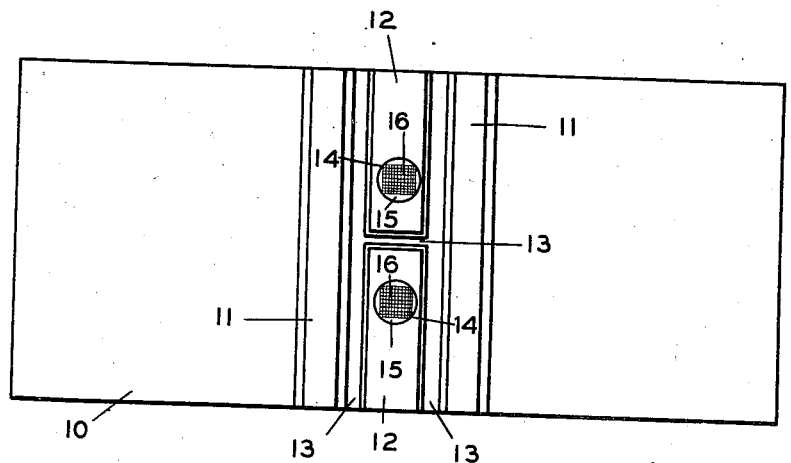
Fig. 1 is a plan view of a hemacytometer embodying my invention.
Figure 2:
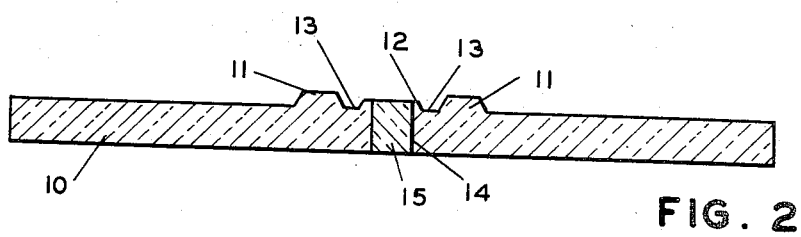
Fig. 2 is a section through one of the ruled areas.

Counting chambers or slides such as hemacytometers used with high power microscopes are ruled with very fine lines and these lines are difficult to find under high magnifications. The depth of field of a high power microscope is very small and the observer cannot tell whether the ruled area is in the field of the microscope unless the microscope is accurately focused on the rulings.

This difficulty is solved by the present invention wherein 10 designates the body of a slide such as a hemacytometer or counting chamber. This slide is formed with the usual spaced ribs 11 for supporting the usual cover glass, not shown. Between the ribs 11 are two raised tables 12 separated from each other and from the ribs 11 by grooves or moats 13.

The slide 10 is formed with two holes 14 extending entirely or partially through the tables 12 and a plug 15 is secured in each hole. The top surface of the plug 15 forms the bottom of the counting chamber and is ruled with a suitable scale or grid 16.

The slide 10 and plug 15 may be formed of any suitable transparent material but I prefer to make both of glass and secure them together by fusing, cementing or the like. In order that the grid 16 may be readily found under the microscope even though out of focus, I use glasses of different light transmission for the body 10 and plug 15. One very practical hemacytometer was made by making the body 10 of an amber glass and using a blue glass to form the plug 15. In using this slide, the microscopist could readily determine when the grid 16 was in the microscope field as the field would then be blue even though the lines of the grid 16 were out of focus and could not be seen. Other combinations of colors or differences in transmissions can, of course, be used.

Figure 3:
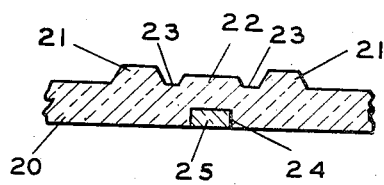
Fig. 3 is a section of a modification.

In the modification shown in Fig. 3, the hemacytometer or counting chamber is made in the usual way. A glass body 20 is formed with the usual cover glass supporting ribs 21 and the usual table or tables 22 separated from the ribs 21 by moats 23. The grid is ruled on the top of the table 22 in the usual and well known manner.

According to my invention, a depression 24 is formed in the bottom of the body 20 directly beneath the ruled grid on the table 22 and a filter 25 is cemented or fused in this depression 24. As in the previous embodiment, this filter 25 has a different light transmission than the body 20 and, when the microscope field indicates the presence of the filter 25, the microscopist knows that the ruled grid is directly beneath the objective.

From the foregoing, it will be apparent that I am able to attain the objects of my invention and provide a hemacytometer or counting chamber in which the ruled area can be readily and easily located in the field of a microscope. Throughout the specification and claims, the term hemacytometer is intended to include other counting chambers or equivalent microscope slides. Various modifications of form or changes of materials or construction may be readily made without departing from the spirit of my invention or the scope of the appended claims.

I claim:

1. A hemacytometer comprising a light-transmitting plate having an opening, a light-transmitting member secured in said opening, said member having a ruled area on an exposed surface which is substantially coextensive with said surface, said member and plate having a different light transmittance whereby said ruled area may be easily located under a microscope.

2. A hemacytometer comprising a glass plate having an opening, a glass filter member fused in said opening, a surface of said member having a ruled area substantially coextensive therewith, said plate and member being of contrasting colors whereby the ruled area may be easily located under a microscope.

3. A hemacytometer having a transparent body portion, a section in said body portion visually distinguishable from the remainder of said body portion, said section having a different light transmittance than the remainder of said body portion and being located between opposed surfaces of the body portion, and a ruled area on one of said surfaces in alignment with said section, the area of the section and the ruled area being substantially equal.

WILLIAM BAUSCH.